United States Patent
Yoakum-Stover et al.

(10) Patent No.: US 7,372,988 B2
(45) Date of Patent: May 13, 2008

(54) REGISTRATION OF SCANNING DATA ACQUIRED FROM DIFFERENT PATIENT POSITIONS

(75) Inventors: Suzanne Yoakum-Stover, Sag Harbor, NY (US); Arie E. Kaufman, Plainview, NY (US); Kevin Kreeger, Sunnyvale, CA (US)

(73) Assignees: Viatronix Incorporated, Stony Brook, NY (US); Research Foundation of State University of NY, Stony Brook, NY (US)

( * ) Notice: Subject to any disclaimer, the term of this patent is extended or adjusted under 35 U.S.C. 154(b) by 0 days.

(21) Appl. No.: 11/273,430

(22) Filed: Nov. 14, 2005

(65) Prior Publication Data

US 2006/0062450 A1    Mar. 23, 2006

Related U.S. Application Data

(63) Continuation of application No. 10/496,430, filed as application No. PCT/US02/37387 on Nov. 21, 2002.

(60) Provisional application No. 60/331,712, filed on Nov. 21, 2001.

(51) Int. Cl.
    *G06K 9/00*    (2006.01)

(52) U.S. Cl. .................. 382/154; 382/128; 382/294; 600/407; 128/920

(58) Field of Classification Search ................ 382/154, 382/131, 133, 195, 196, 128, 294; 219/121.7, 219/127.71; 30/162, 125, 320; 347/37, 347/137, 130; 248/298.1, 906; 228/180.21; 346/145; 29/834; 600/407, 416; 128/920, 128/922; 378/20; 345/419

See application file for complete search history.

(56) References Cited

U.S. PATENT DOCUMENTS

| | | | |
|---|---|---|---|
| 6,333,786 B1 * | 12/2001 | Uzawa et al. ............... | 356/401 |
| 6,928,314 B1 * | 8/2005 | Johnson et al. ............ | 600/407 |
| 2005/0169507 A1 * | 8/2005 | Kreeger et al. ............ | 382/128 |

* cited by examiner

*Primary Examiner*—Sheela Chawan
(74) *Attorney, Agent, or Firm*—F. Chau & Associates, LLC

(57) ABSTRACT

A system and method are provided for generating a three-dimensional visualization image of an object such as an organ using volume visualization techniques and exploring the image using a guided navigation system that allows the operator to travel along a flight path and to adjust the view to a particular portion of the image of interest in order, for example, to identify polyps, cysts or other abnormal features in the visualized organ; where imaging data sets are acquired using conventional two-dimensional scans of the object in both a supine and prone orientation, and correspondence between the respective data sets is determined to permit jumping from one visualization orientation to the other while remaining at the same virtual location within the organ.

17 Claims, 8 Drawing Sheets

REGISTRATION OF SCANNING DATA ACQUIRED FROM DIFFERENT PATIENT POSITIONS

CROSS-REFERENCE TO RELATED APPLICATION

This application is a continuation of application Ser. No. 10/496,430 filed on May 21, 2004, which claims the benefit under 35 U.S.C. § 365(c) of PCT International Application Designating the United States, Serial No. PCT/US02/37387, entitled "REGISTRATION OF SCANNING DATA ACQUIRED FROM DIFFERENT PATIENT POSITIONS", and filed Nov. 21, 2002, which is incorporated herein by reference in its entirety; and which, in turn, claims the benefit under 35 U.S.C. § 119(e) of U.S. Provisional Patent Application Ser. No. 60/331,712, entitled "New Features For Virtual Colonoscopy", filed Nov. 21, 2001, which is incorporated herein by reference in its entirety.

BACKGROUND OF THE INVENTION

The present disclosure relates to a system and method for performing a volume based three-dimensional virtual examination, and more particularly relates to a method providing enhanced visualization and navigation properties.

Two-dimensional ("2D") visualization of human organs using medical imaging devices has been widely used for patient diagnosis. Currently available medical imaging devices include computed tomography ("CT") and magnetic resonance imaging ("MRI"), for example. Three-dimensional ("3D") images can be formed by stacking and interpolating between two-dimensional pictures produced from the scanning machines. Imaging an organ and visualizing its volume in three-dimensional space would be beneficial due to the lack of physical intrusion and the ease of data manipulation. However, the exploration of the three-dimensional volume image must be properly performed in order to fully exploit the advantages of virtually viewing an organ from the inside.

When viewing the 3D volume virtual image of an environment, a functional model must be used to explore the virtual space. One possible model is a virtual camera, which can be used as a point of reference for the viewer to explore the virtual space. Camera control in the context of navigation within a general 3D virtual environment has been previously studied. There are two conventional types of camera control offered for navigation of virtual space. The first gives the operator full control of the camera, which allows the operator to manipulate the camera in different positions and orientations to achieve the view, desired. The operator will in effect pilot the camera. This allows the operator to explore a particular section of interest while ignoring other sections. However, complete control of a camera in a large domain would be tedious and tiring, and an operator might not view all the important features between the start and finishing point of the exploration.

The second technique of camera control is a planned navigational method, which assigns the camera a predetermined path to take and which cannot be changed by the operator. This is akin to having an engaged "autopilot". This allows the operator to concentrate on the virtual space being viewed, and not have to worry about steering into walls of the environment being examined. However, this second technique does not give the viewer the flexibility to alter the course or investigate an interesting area viewed along the flight path.

It would be desirable to use a combination of the two navigation techniques described above to realize the advantages of both techniques while minimizing their respective drawbacks. It would be desirable to apply a flexible navigation technique to the examination of human or animal organs that are represented in virtual 3D space in order to perform a non-intrusive painless and thorough examination. The desired navigational technique would further allow for a complete examination of a virtual organ in 3D space by an operator, allowing flexibility while ensuring a smooth path and complete examination through and around the organ. It would be additionally desirable to be able to display the exploration of the organ in a real time setting by using a technique that minimizes the computations necessary for viewing the organ. The desired technique should also be equally applicable to exploring any virtual object.

In practical application, radiological scanning equipment, for example, is used to acquire respective scan data from a patient from both a supine (i.e., face up) and prone (i.e., face down) position. Other than being gathered from the same patient, the image data corresponding to the two orientations are completely independent. As a consequence, when an interesting feature is located in one orientation or view, there is currently no way to automatically "jump" to that same feature in the other orientation or view.

SUMMARY OF THE INVENTION

A preferred embodiment of the present disclosure generates a three-dimensional visualization image of an object such as a human organ using volume visualization techniques and explores the virtual image using a guided navigation system, which allows the operator to travel along a predefined flight path and to adjust both the position and viewing angle to a particular portion of interest in the image away from the predefined path in order to identify polyps, cysts or other abnormal features in the organ.

In accordance with a navigation method for virtual examination, a fly-path through a virtual organ, such as a colon lumen, is generated. From the volume element representation of the colon lumen, volume shrinking from the wall of the virtual colon lumen is used to generate a compressed colon lumen data set. From the compressed colon lumen data set, a minimum distance path is generated between endpoints of the virtual colon lumen. Control points are then extracted along the minimum distance path along the length of the virtual colon lumen. The control points are then centered within the virtual colon lumen. Finally, a line is interpolated between the centered control points to define the final navigation fly-path.

In the above method for generating a fly-path, the step of volume shrinking can include the steps of representing the colon lumen as a plural stack of image data; applying a discrete wavelet transformation to the image data to generate a plurality of sub-data sets with components at a plurality of frequencies, and then selecting the lowest frequency components of the sub-data sets.

Another method for generating a fly-path through a virtual colon lumen during virtual colonoscopy includes the step of partitioning the virtual colon lumen into a number of segments. A point is selected within each segment and the points are centered with respect to a wall of the virtual colon lumen. The centered control points are then connected to establish the fly path.

A method for performing examination of a virtual colon lumen includes a volume rendering operation. For each viewpoint within the colon lumen, rays are cast from the viewpoint through each image pixel. The shortest distance from the viewpoint to a wall of the colon lumen is determined for each ray. If the distance exceeds a predetermined sampling interval, the processing effects a jump along the ray by the distance and assigns a value based on an open space transfer function to the points along the ray over the jumped distance. If the distance does not exceed the sampling interval, then the current points are sampled and displayable properties are determined according to a transfer function.

In another method in accordance with the present virtual imaging disclosure, a method of performing virtual colonoscopy includes the step of acquiring an image data set of a region, including the colon, and converting the image data to volume units. Those volume units representing a wall of the colon lumen are identified and a fly-path for navigating through the colon lumen is established. At least one transfer function is then used to map color and opacity coefficients to the wall of the colon lumen. The colon can then be displayed along the fly-path in accordance with the assigned transfer functions.

In a method of virtual colonoscopy, the step of generating a fly-path can include using volume shrinking from the wall of the virtual colon lumen to generate a reduced data set. From the reduced data set, a minimum distance path between endpoints of the virtual colon lumen is generated. Control points along a length of the virtual colon lumen can then be assigned along the minimum distance path. The control points within the virtual colon lumen are then centered and a line connecting the centered control points is interpolated to complete the navigational fly-path.

Alternatively, a fly-path can be generated by partitioning the virtual colon lumen into a plurality of segments, selecting a point within each segment, centering each point with respect to the wall of the virtual colon lumen, and connecting the centered points to establish the fly-path.

A system for three dimensional imaging, navigation and examination of a region in accordance with the present disclosure includes an imaging scanner, such as an MRI or CT scanner, for acquiring image data. A processor converts the image data into a plurality of volume elements forming a volume element data set. The processor also performs the further steps of identifying those volume units representing a wall of the colon lumen, establishing a fly-path for navigating through said colon lumen, and applying at least one transfer function to map color and opacities to the wall of the colon lumen. A display unit is operatively coupled to the processor for displaying a representation of the region in accordance with the fly-path and the at least one transfer function.

An alternate computer-based system for virtual examination, formed in accordance with an embodiment of the present disclosure, is based on a bus structure architecture. A scanner interface board is coupled to the bus structure and provides data from an imaging scanner to the bus. Main memory is provided which is also coupled to the bus. A volume rendering board having locally resident volume rendering memory receives at least a portion of the data from the imaging scanner and stores this data in the volume rendering memory during a volume rendering operation. A graphics board is coupled to the bus structure and to a display device for displaying images from the system. A processor is operatively coupled to the bus structure and is responsive to the data from the imaging scanner. The processor converts the data from the imaging scanner into a volume element representation, stores the volume element representation in main memory, partitions the volume element representation into image slices, and transfers the volume element partitions to the volume rendering board.

One aspect of the present disclosure relates to a method for registering a prone-view with a supine-view three-dimensional volume representation of at least one object. According to this aspect, for the prone-view representation, a first set of features along a prone-view centerline is located, and for the supine-view representation, a second set of features along a supine-view centerline is located. Next, at least one feature in the first set is matched with corresponding features in the second set; alternatively, at least one feature in the second set is matched with corresponding features in the first set.

Another aspect of the present disclosure relates to a method for performing a three-dimensional internal examination of at least one organ. According to this aspect, the organ is scanned with a radiological device to produce first and second scan data sets representative of the organ in a prone and supine view, respectively. A prone-view three-dimensional volume representation of the organ comprising volume elements is created from the prone-view scan data and a supine-view three-dimensional volume representation of the organ comprising volume elements is created from the supine-view scan data. Next, a prone-view centerline and a supine-view centerline within the respective three-dimensional representation are generated, and the volume elements responsive to the respective centerline and operator's input during a guided navigation along one of the supine-view or prone-view three-dimensional representations is displayed in real time. Respective features are identified along each centerline and matched to create pairs of corresponding features. An operator can jump from a current location in one three-dimensional representation to a target location in the other based on the relative location from respective corresponding features.

BRIEF DESCRIPTION OF THE DRAWINGS

Further objects, features and advantages of the present disclosure will become apparent from the following detailed description taken in conjunction with the accompanying figures showing preferred embodiments of the disclosure, in which.

DETAILED DESCRIPTION OF PREFERRED EMBODIMENTS

While the methods and systems described herein may be applied to any object to be examined, the preferred embodiment to be described is the examination of an organ in the human body, specifically the colon. The colon is long and twisted, which makes it especially suited for a virtual examination saving the patient both monetary expense as well as the discomfort and increased hazard of a physical probe. Other examples of organs that can be examined include the lungs, stomach and portions of the gastrointestinal system, the heart and blood vessels.

Figure 1:
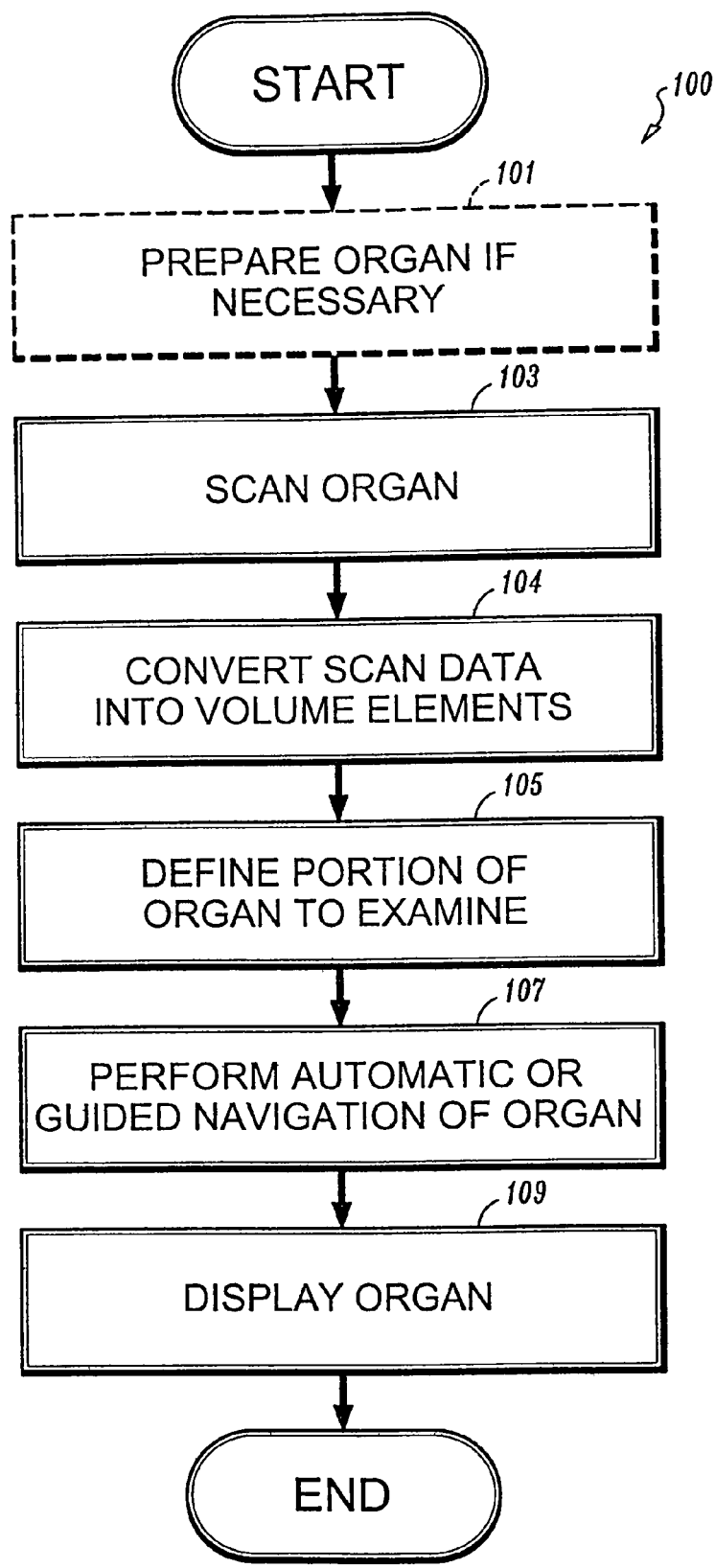
FIG. 1 shows a flow chart of the steps for performing a virtual examination of an object, specifically a colon, in accordance with the disclosure.

As shown in FIG. 1, a method for performing a virtual examination of an object such as a colon is indicated generally by the reference numeral 100. The method 100 illustrates the steps necessary to perform a virtual colonoscopy using volume visualization techniques. Step 101 prepares the colon to be scanned in order to be viewed for examination if required by either the doctor or the particular scanning instrument. This preparation could include cleansing the colon with a "cocktail" or liquid, which enters the colon after being orally ingested and passed through the stomach. The cocktail forces the patient to expel waste material that is present in the colon. One example of a substance used is Golytcly. Additionally, in the case of the colon, air or carbon dioxide can be forced into the colon in order to expand it to make the colon easier to scan and examine. This is accomplished with a small tube placed in the rectum with approximately 1,000 cc of air pumped into the colon to distend the colon. Depending upon the type of scanner used, it may be necessary for the patient to drink a contrast substance such as barium to coat any unexpunged stool in order to distinguish the waste in the colon from the colon walls themselves. Alternatively, the method for virtually examining the colon can remove the virtual waste prior to or during the virtual examination as explained later in this specification. Step 101 does not need to be performed in all examinations as indicated by the dashed line in FIG. 1.

Step 103 scans the organ that is to be examined. The scanner can be an apparatus well known in the art, such as a spiral CT-scanner for scanning a colon or a Zenith MRI machine for scanning a lung labeled with xenon gas, for example. The scanner must be able to take multiple images from different positions around the body during suspended respiration, in order to produce the data necessary for the volume Visualization. For example, data can be acquired using a GE/CTI spiral mode scanner operating in a helical mode of 5 mm, 1.5-2.0:1 pitch, reconstructed in 1 mm slices, where the pitch is adjusted based upon the patient's height in a known manner. A routine imaging protocol of 120 kVp and 200-280 ma can be utilized for this operation. The data can be acquired and reconstructed as 1 mm thick slice images having an array size of 512×512 pixels in the field of view, which varies from 34 to 40 cm depending on the patient's size. The number of such slices generally varies under these conditions from 300 to 450, depending on the patient's height. The image data set is converted to volume elements or voxels.

An example of a single CT-image would use an X-ray beam of 5 mm width, 1:1 to 2:1 pitch, with a 40 cm field-of-view being performed from the top of the splenic flexure of the colon to the rectum.

Discrete data representations of the object can be produced by other methods besides scanning. Voxel data representing an object can be derived from a geometric model by techniques described in U.S. Pat. No. 5,038,302 entitled "Method of Connecting Continuous Three-Dimensional Geometrical Representations into Discrete Three-Dimensional Voxel-Based Representations Within a Three-Dimensional Voxel-Based System" by Kaufman, issued Aug. 8, 1991, filed Jul. 26, 1988, which is hereby incorporated by reference in its entirety. Additionally, data can be produced by a computer model of an image, which can be converted to three-dimensional voxels and explored in accordance with this disclosure.

Step 104 converts the scanned images into three-dimensional volume elements ("voxels"). In a preferred embodiment for examining a colon, the scan data is reformatted into 5 mm thick slices at increments of 1 mm or 2.5 mm and reconstructed in 1 mm slices, with each slice represented as a matrix of 512 by 512 pixels. By doing this, voxels of approximately 1 cubic mm are created. Thus a large number of 2D slices are generated depending upon the length of the scan. The set of 2D slices is then reconstructed to 3D voxels. The conversion process of 2D images from the scanner into 3D voxels can either be performed by the scanning machine itself or by a separate machine such as a computer implementing techniques that are well known in the art (see, e.g., U.S. Pat. No. 4,985,856 entitled "Method and Apparatus for Storing, Accessing, and Processing Voxel-based Data" by Kaufman et al.; issued Jan. 15, 1991, filed Nov. 11, 1988; which is hereby incorporated by reference in its entirety).

Step 105 allows the operator to define the portion of the selected organ to be examined. A physician may be interested in a particular section of the colon likely to develop polyps. The physician can view a two dimensional slice overview map to indicate the section to be examined. A starting point and finishing point of a path to be viewed can be indicated by the physician/operator. A conventional computer and computer interface (e.g., keyboard, mouse or spaceball) can be used to designate the portion of the colon that is to be inspected. A grid system with coordinates can be used for keyboard entry or the physician/operator can "click" on the desired points. The entire image of the colon can also be viewed if desired.

Step 107 performs the planned or guided navigation operation of the virtual organ being examined. Performing a guided navigation operation is defined as navigating through an environment along a predefined or automatically predetermined flight path, which can be manually adjusted by an operator at any time. After the scan data has been converted to 3D voxels, the inside of the organ is traversed from the selected start to the selected finishing point. The virtual examination is modeled on having a tiny viewpoint or "camera" traveling through the virtual space with a view direction or "lens" pointing towards the finishing point. The guided navigation technique provides a level of interaction with the camera, so that the camera can navigate through a virtual environment automatically in the case of no operator interaction, and at the same time, allow the operator to manipulate the camera when necessary. The preferred embodiment of achieving guided navigation is to use a physically based camera model that employs potential fields to control the movement of the camera, as is further detailed with respect to FIG. 2.

Step 109, which can be performed concurrently with step 107, displays the inside of the organ from the viewpoint of the camera model along the selected pathway of the guided navigation operation. Three-dimensional displays can be generated using techniques well known in the art such as the marching cubes technique, for example. In order to produce a real time display of the colon, a technique is used that reduces the vast number of data computations necessary for the display of the virtual organ.

The method described in FIG. 1 can also be applied to scanning multiple organs in a body at the same time. For example, a patient may be examined for cancerous growths in both the colon and lungs. The method of FIG. 1 would be modified to scan all the areas of interest in step 103 and to select the current organ to be examined in step 105. For example the physician/operator may initially select the colon to virtually explore and later explore the lung. Alternatively, two different doctors with different specialties may virtually explore different scanned organs relating to their respective specialties. Following step 109, the next organ to be examined is selected and its portion will be defined and explored. This continues until all organs that need examination have been processed.

The steps described in conjunction with FIG. 1 can also be applied to the exploration of any object that can be represented by volume elements. For example, an architectural structure or inanimate object can be represented and explored in the same manner.

Figure 2:
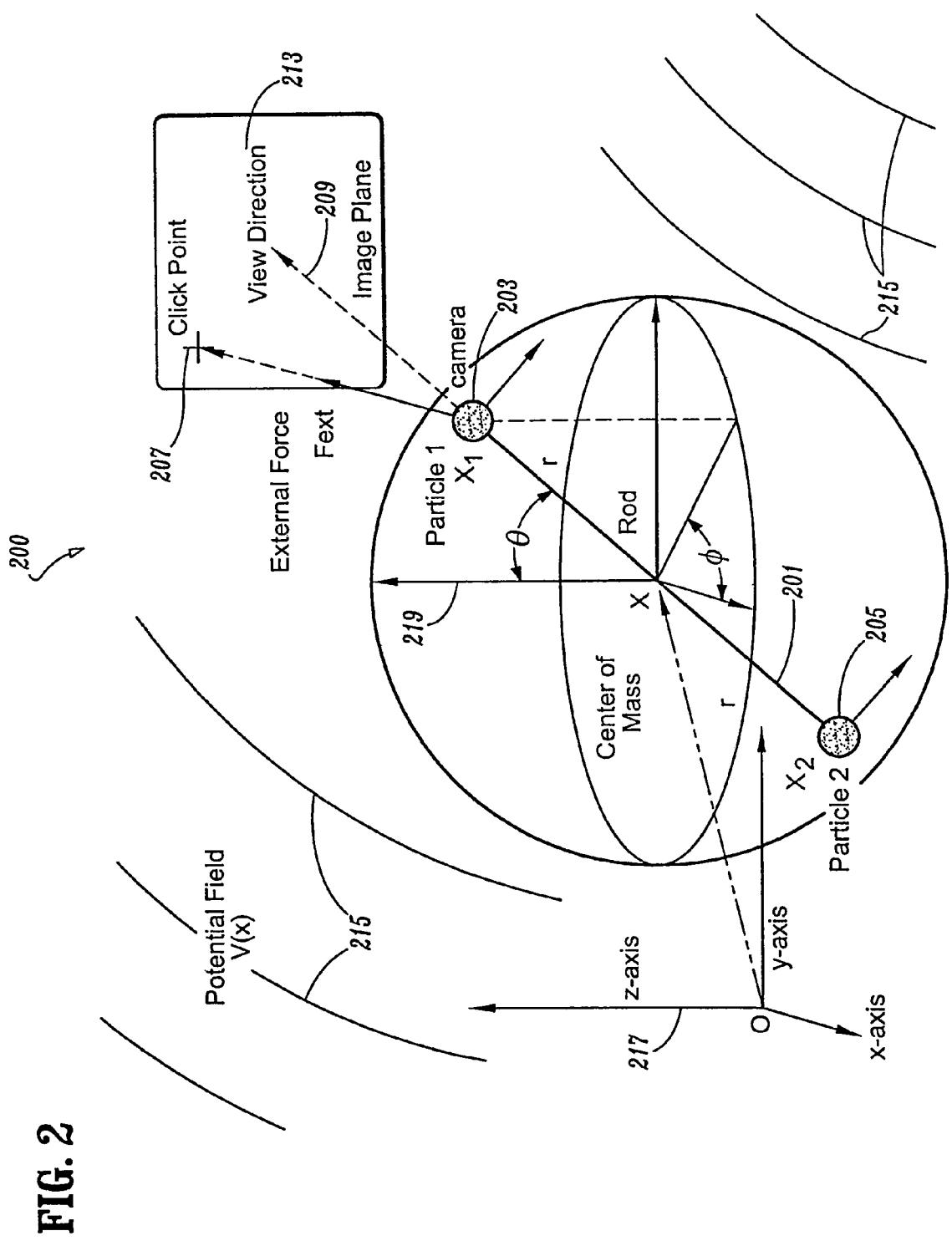
FIG. 2 shows an illustration of a "submarine" camera model which performs guided navigation in the virtual organ.

Turning to FIG. 2, a "submarine camera" model that performs guided navigation in a virtual organ is indicated generally by the reference numeral 200. The model 200 depicts a viewpoint control model that performs the guided navigation technique of step 107. When there is no operator control during guided navigation, the default navigation is similar to that of planned navigation that automatically directs the camera along a flight path from one selected end of the colon to another. During the planned navigation phase, the camera stays at the center of the colon for obtaining better views of the colonic surface. When an interesting region is encountered, the operator of the virtual camera using guided navigation can interactively bring the camera close to a specific region and direct the motion and angle of the camera to study the interesting area in detail, without unwillingly colliding with the walls of the colon. The operator can control the camera with a standard interface device such as a keyboard, mouse or non-standard device such as a spaceball. In order to fully operate a camera in a virtual environment, six degrees of freedom for the camera are required. The camera must be able to move in the horizontal, vertical, and depth or Z direction (axes 217), as well as being able to rotate in another three degrees of freedom (axes 219) to allow the camera to move and scan all sides and angles of a virtual environment.

Methods for computing a centerline inside the area of interest are well known in the art (see, e.g., U.S. Pat. No. 5,971,767 entitled "SYSTEM AND METHOD FOR PERFORMING A THREE-DIMENSIONAL VIRTUAL EXAMINATION" by Kaufman et al.; issued Oct. 26, 1999 and incorporated by reference herein in its entirety).

Figure 3:
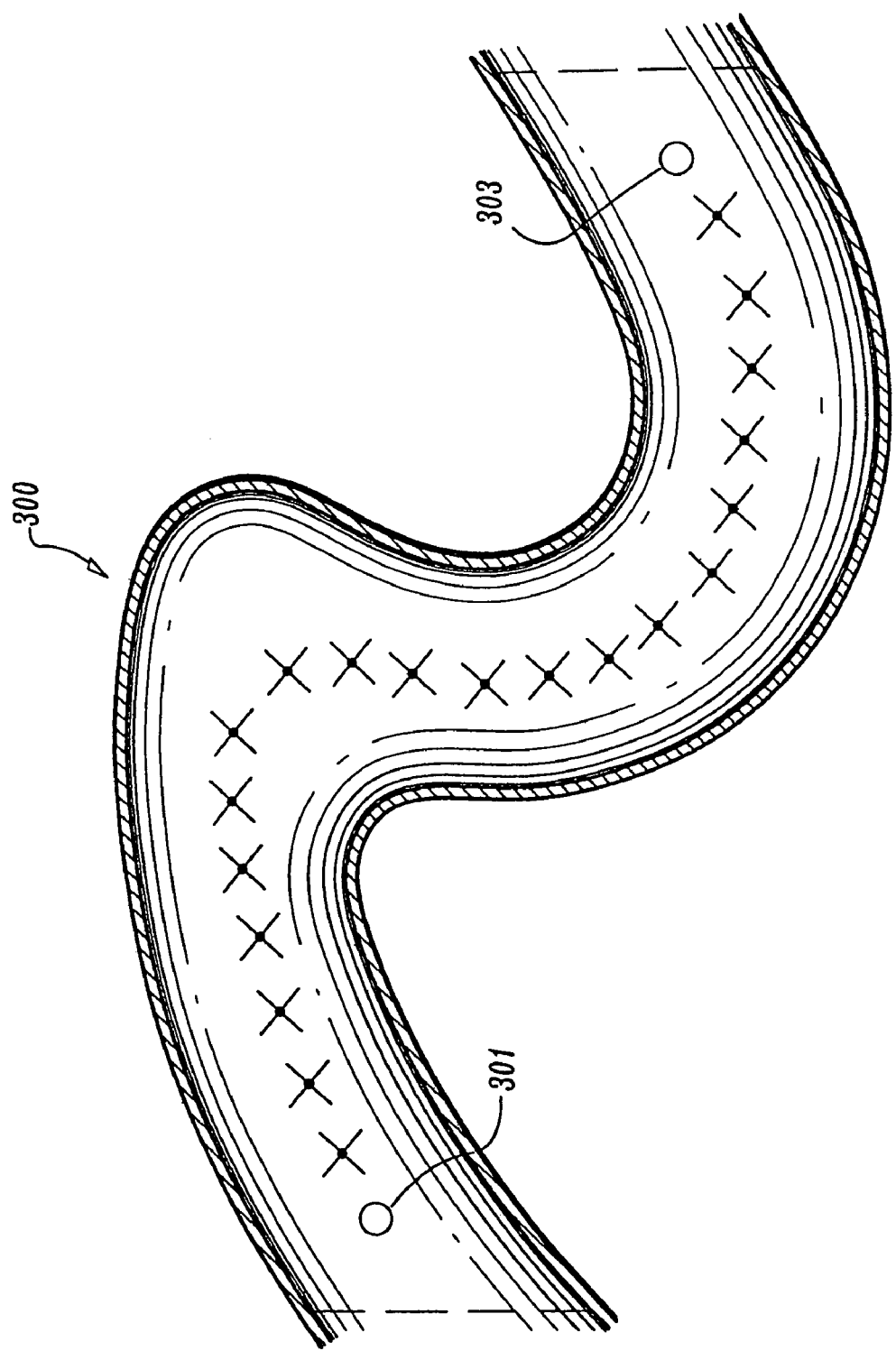
FIG. 3 shows a diagram illustrating a two dimensional cross-section of a volumetric colon which contains the remaining flight path.

Referring to FIG. 3, a two dimensional cross-section of a volumetric colon containing a flight path is indicated generally by the reference numeral 300. The cross-section 300 includes the final flight path for the camera model down the center of the colon, as indicated by "x"s, and at least one starting location 301 or 303 near one end of the colon.

Figure 4:
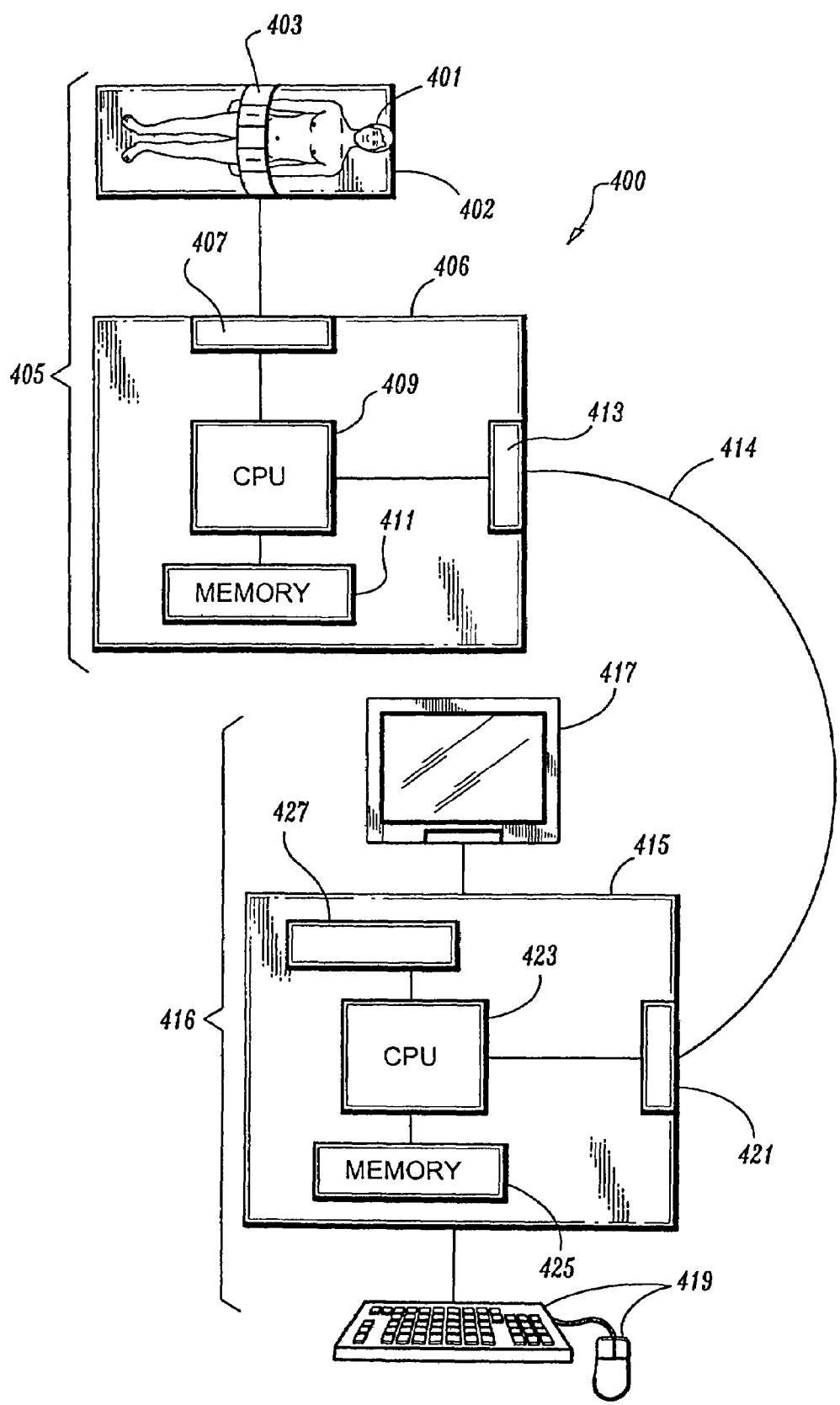
FIG. 4 shows a diagram of a system used to perform a virtual examination of a human organ in accordance with the disclosure.

Turning now to FIG. 4, a system used to perform a virtual examination of a human organ in accordance with the disclosure is indicated generally by the reference numeral 400. The system 400 is for performing the virtual examination of an object such as a human organ using the techniques described herein. A patient 401 lays on a platform 402, while a scanning device 405 scans the area that contains the organ or organs to be examined. The scanning device 405 contains a scanning portion 403 that takes images of the patient and an electronics portion 406. The electronics portion 406 includes an interface 407, a central processing unit 409, a memory 411 for temporarily storing the scanning data, and a second interface 413 for sending data to a virtual navigation platform or terminal 416. The interfaces 407 and 413 may be included in a single interface component or may be the same component. The components in the portion 406 are connected together with conventional connectors.

In the system 400, the data provided from the scanning portion 403 of the device 405 is transferred to unit 409 for processing and is stored in memory 411. The central processing unit 409 converts the scanned 2D data to 3D voxel data and stores the results in another portion of the memory 411. Alternatively, the converted data may be directly sent to the interface unit 413 to be transferred to the virtual navigation terminal 416. The conversion of the 2D data could also take place at the virtual navigation terminal 416 after being transmitted from the interface 413. In the preferred embodiment, the converted data is transmitted over a carrier 414 to the virtual navigation terminal 416 in order for an operator to perform the virtual examination. The data may also be transported in other conventional ways, such as storing the data on a storage medium and physically transporting it to terminal 416 or by using satellite transmissions, for example.

The scanned data need not be converted to its 3D representation until the visualization-rendering engine requires it to be in 3D form. This saves computational steps and memory storage space.

The virtual navigation terminal 416 includes a screen for viewing the virtual organ or other scanned image, an electronics portion 415 and an interface control 419 such as a keyboard, mouse or spaceball. The electronics portion 415 includes an interface port 421, a central processing unit 423, optional components 427 for running the terminal and a memory 425. The components in the terminal 416 are connected together with conventional connectors. The converted voxel data is received in the interface port 421 and stored in the memory 425. The central processing unit 423 then assembles the 3D voxels into a virtual representation and runs the submarine camera model as described for FIG. 2 to perform the virtual examination. As the submarine camera travels through the virtual organ, the visibility technique is used to compute only those areas that are visible from the virtual camera, and display them on the screen 417. A graphics accelerator can also be used in generating the representations. The operator can use the interface device 419 to indicate which portion of the scanned body is desired to be explored. The interface device 419 can further be used to control and move the submarine camera as desired as detailed for FIG. 2. The terminal portion 415 can be, for example, the Cube-4 dedicated system box, generally available from the Department of Computer Science at the State University of New York at Stony Brook.

The scanning device 405 and terminal 416, or parts thereof, can be part of the same unit. A single platform would be used to receive the scan image data, connect it to 3D voxels if necessary and perform the guided navigation.

An important feature in system 400 is that the virtual organ can be examined at a later time without the presence of the patient. Additionally, the virtual examination could take place while the patient is being scanned. The scan data can also be sent to multiple terminals, which would allow more than one doctor to view the inside of the organ simultaneously. Thus a doctor in New York could be looking at the same portion of a patient's organ at the same time with a doctor in California while discussing the case. Alternatively, the data can be viewed at different times. Two or more doctors could perform their own examination of the same data in a difficult case. Multiple virtual navigation terminals could be used to view the same scan data. By reproducing the organ as a virtual organ with a discrete set of data, there are a multitude of benefits in areas such as accuracy, cost and possible data manipulations.

Some of the applicable techniques may be further enhanced in virtual colonoscopy applications through the use of a number of additional techniques that are described in U.S. Pat. No. 6,343,936 entitled "SYSTEM AND METHOD FOR PERFORMING A THREE-DIMENSIONAL VIRTUAL EXAMINATION, NAVIGATION AND VISUALIZATION" by Kaufman et al.; issued Feb. 7, 2002, which is incorporated herein by reference in its entirety. These improvements, described briefly below, include improved colon cleansing, volume rendering, additional fly-path determination techniques, and alternative hardware embodiments.

An improved electronic colon cleansing technique employs modified bowel preparation operations followed by image segmentation operations, such that fluid and stool remaining in the colon during a computed tomographic ("CT") or magnetic resonance imaging ("MRI") scan can be detected and removed from the virtual colonoscopy images. Through the use of such techniques, conventional physical washing of the colon, and its associated inconvenience and discomfort, is minimized or completely avoided.

In addition to image segmentation and texture mapping, volume-rendering techniques may be used in connection with virtual colonoscopy procedures to further enhance the fidelity of the resulting image. Methods for volume rendering are well known to those of ordinary skill in the pertinent art.

Figure 5:
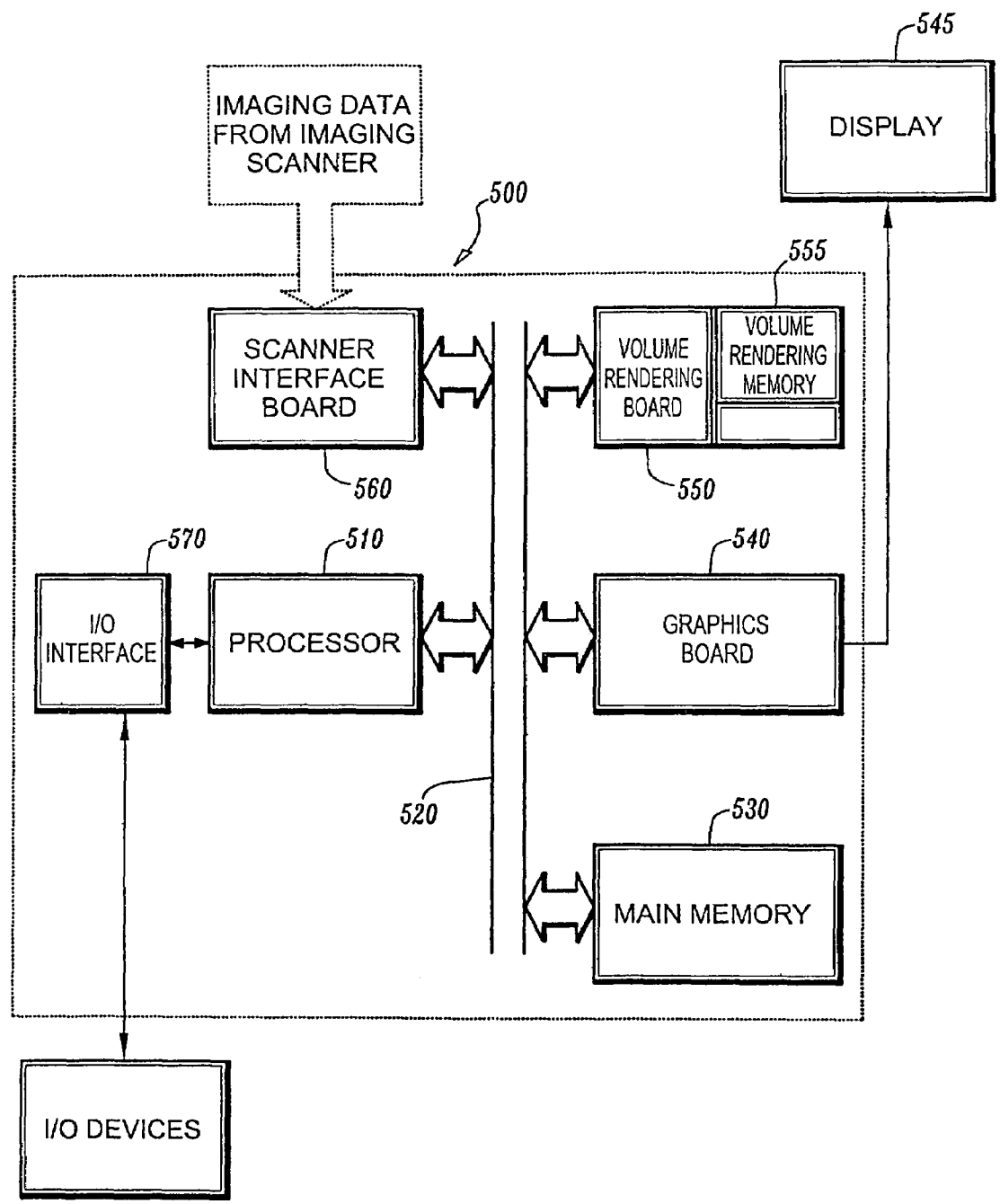
FIG. 5 shows a block diagram of a system embodiment based on a personal computer bus architecture.

Turning to FIG. 5, a system embodiment based on a personal computer bus architecture is indicated generally by the reference numeral 500. The system 500 includes an alternate hardware embodiment suitable for deployment on a personal computer ("PC"), as illustrated. The system 500 includes a processor 510 that preferably takes the form of a high speed, multitasking processor, such as, for example, a Pentium III processor operating at a clock speed in excess of 400 MHZ. The processor 510 is coupled to a conventional bus structure 520 that provides for high-speed parallel data transfer. Also coupled to the bus structure 520 are a main memory 530, a graphics board 540, and a volume rendering board 550. The graphics board 540 is preferably one that can perform texture mapping, such as, for example, a Diamond Viper v770 Ultra board manufactured by Diamond Multimedia Systems. The volume rendering board 550 can take the form of the VolumePro board from Mitsubishi Electric, for example, which is based on U.S. Pat. Nos. 5,760,781 and 5,847,711, which are hereby incorporated by reference in their entirety. A display device 545, such as a conventional SVGA or RGB monitor, is operably coupled to the graphics board 540 for displaying the image data. A scanner interface board 560 is also provided for receiving data from an imaging scanner, such as an MRI or CT scanner, for example, and transmitting such data to the bus structure 520. The scanner interface board 560 may be an application specific interface product for a selected imaging scanner or can take the form of a general-purpose input/output card. The PC based system 500 will generally include an I/O interface 570 for coupling I/O devices 580, such as a keyboard, digital pointer or mouse, and the like, to the processor 510. Alternatively, the I/O interface can be coupled to the processor 510 via the bus 520.

In practical application, radiological scanning equipment is used to acquire respective scan data from a patient from both a supine (i.e., face up) and prone (i.e., face down) position. Other than being gathered from the same patient, the image data corresponding to the two orientations are completely independent. As a consequence, when an interesting feature is located in one orientation or view, there is currently no way to automatically "jump" to that same feature in the other orientation or view. To enable meaningful switching between to the two views, the underlying image data must be linked, or associated in some way. The colon, for example, is a flexible organ that may change its geometry significantly when the a patient is re-oriented and, thus, the problem falls into the class known as non-rigid image registration problems.

A number of different approaches can be used to register the two views of a virtual organ. However, to be useful, the image registration algorithm should be computationally efficient. For that reason, embodiments of the present disclosure focus on methods that use information regarding the centerline of the organ to establish a correspondence between the points on each centerline. The centerline of the virtual organ can be calculated according to any of the previously described methods or any other method as known to those of ordinary skill in the pertinent art. This focused approach effectively reduces the problem to one-dimension and, thus, is computationally efficient.

A first step in establishing a correspondence between the supine-view and prone-view centerlines is to identify features that are common to both. The correspondence, in the different views, of points between such landmark features is then performed using simple interpolation (e.g., linear, higher order, and the like) techniques that can be found in computer science literature (see, e.g., Brown, L. G. 1992, A Survey of Image Registration Techniques, ACM Computing Surveys 24(4), 325-376).

There are a few possibilities for elements that constitute a feature along the centerline. Examples include the hepatic flexure, the splenic flexure, end points of the centerline, internal hostral folds, and bends and curves of the lumen. Of these possibilities, the hepatic flexure, which generally has the highest "z" value along the center-line, or the splenic flexure, which generally has a lower "z" value along the center-line, provide an easy means for achieving overall, coarse registration between the two center-lines. In addition, embodiments of the present disclosure utilize the bends or changes of direction of a centerline as good features for addressing the registration problem. As the colon tends to bend only in a few places, the location of these bending places may be used to perform registration.

In the following exemplary embodiment, registration between the supine and prone centerlines is described from the perspective of matching the supine data to that of the prone data. This matching of data can also be performed in the opposite manner.

An initial step for registering the two centerlines is to locate, on each centerline, the bending features. The method of computation is the same for both the prone-view data and the supine-view data. In particular, the change in direction of the centerline is computed for each voxel, $v_i$ along the centerline, where $v_i=(x_i, y_i, z_i)$.

Figure 6:
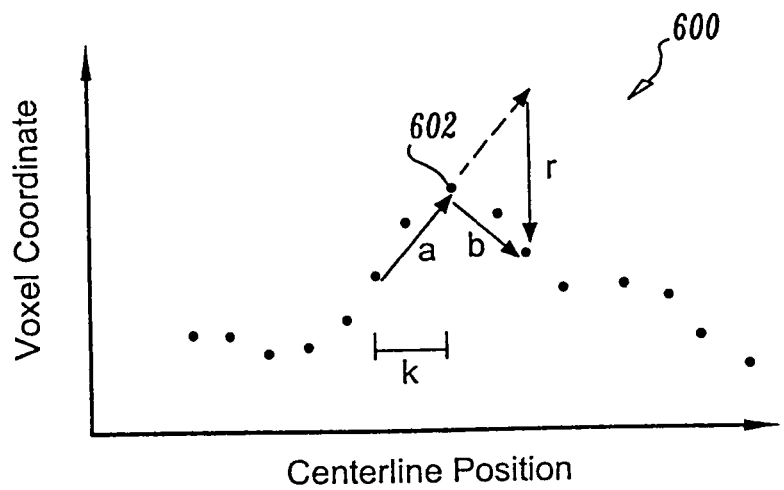
FIG. 6 illustrates a centerline profile with accompanying vectors showing, in accordance with an embodiment of the present disclosure, a change in direction around a voxel.

Referring to FIG. 6, a plot of voxel coordinates versus centerline position is indicated generally by the reference numeral 600, which is helpful in understanding the computation of the change in direction. The graph of FIG. 6 has, as its abscissa, the centerline position of the voxel or, in other words, the "i" of $v_i$. The ordinate axis is one of the voxel coordinates, which for exemplary purposes, is considered to be "z". Point 602 is a voxel $v_i$ along the centerline. Using this point 602, the vectors a, b and r are computed where:

$$a = v_{i-k} - v_i$$

$$b = v_i + v_{i+k}$$

$$r = b - a$$

The length of the difference vector, r, for each voxel point defines the change in direction about the voxel point, such as, for example, the point 602. The value "k" is a constant and can typically be around 100 for data acquired using convention CT scanning devices.

Figure 7A:
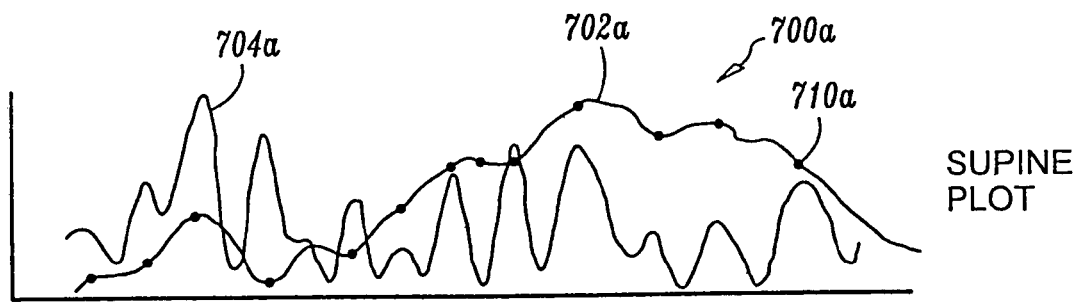
FIGS. 7A and 7B illustrate, respectively, supine and prone centerline plots depicting a "z" profile of the centerline overlaid with a plot of the change in direction of the "z" profile as calculated according to an embodiment of the present disclosure.
Figure 7B:
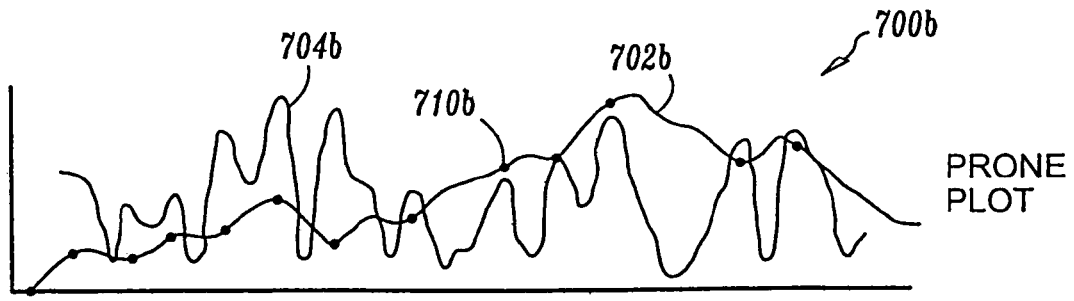

As shown in FIGS. 7A and 7B, supine and prone centerline plots depicting a "z" profile of the centerline overlaid with a plot of the change in direction of the "z" profile are indicated generally by the reference numerals 700A and 700B, respectively. Both plots 700A and 700B depict the above-described algorithm applied to actual CT scan data with k=100. FIG. 7A relates to supine-view data, while FIG. 7B relates to prone-view data. The smoother lines 702a and 702b reflect, for each respective view, the z coordinate of each voxel point along the centerline. The other lines 704a and 704b reflect, for each respective view, the magnitude of the direction of change around each voxel (i.e., the vector r).

From each of the lines 704a and 704b, the locations of significant bends are extracted to serve as features for registering the two centerlines. One algorithm for identifying those features that are significant involves analyzing each point, $a_i$, along the line 704a or 704b. The analysis involves determining whether the following three conditions are satisfied:

$$a_{i-j} <= a_i$$

$$a_{i+j} <= a_i$$

$$a_i - 0.5(a_{i-j} + a_{i+j}) >= T$$

Here, T is an empirically determined threshold value and j is a constant that may, or may not be, the same as the previously used k. A common value for j is j=1. Any voxel, $v_i$, whose change in direction, $a_i$, satisfies these equations represents a significant feature along the centerline. Examples of these significant features are depicted as dots 710a and 710b in FIGS. 7A and 7B, respectively.

Once the features on each centerline are extracted, or identified, the features can be matched to one another. Once matched, a position in one view within a certain proximity of a feature can be estimated in the other view based on the matched feature.

Figure 8A:
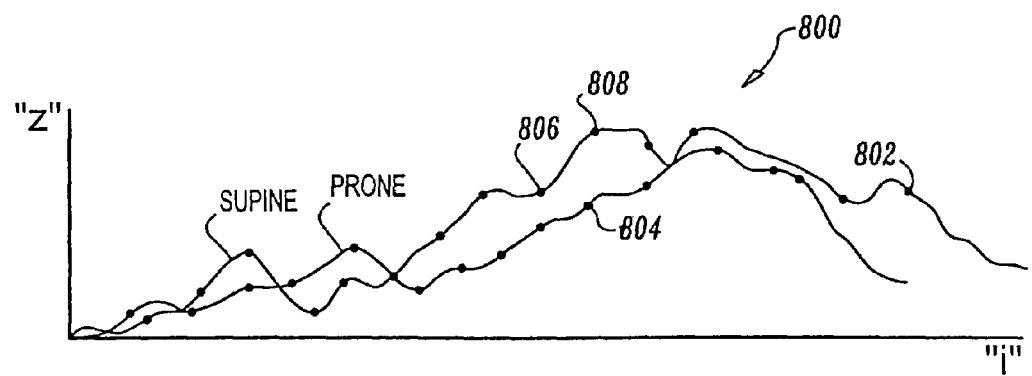
FIG. 8A depicts a voxel z profile for both a supine view and a prone view according to an embodiment of the present disclosure.
Figure 8B:
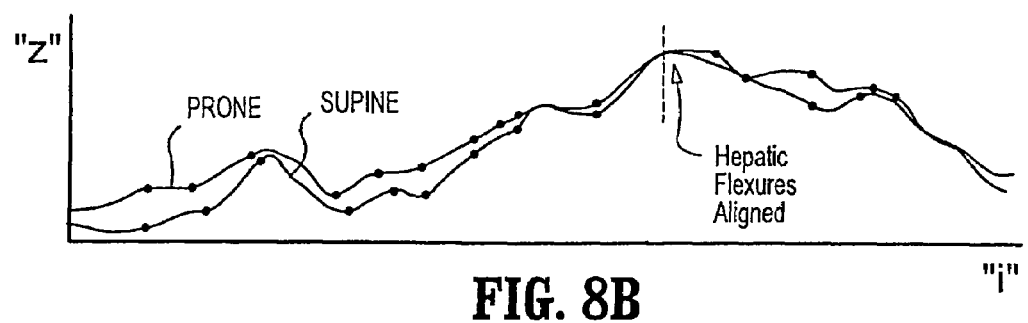
FIG. 8B shows the profiles of FIG. 8A aligned at their hepatic flexures by shifting one view in accordance with an embodiment of the present disclosure.

Turning to FIG. 8A, a voxel z profile for both a supine view and a prone view is indicated generally by the reference numeral 800. The z profile 800 covers both a supine view and a prone view with no manipulation of the significant features 802 in either centerline. Because the centerline data from each view is unrelated and the number of significant features is unlikely to be equal, it is not meaningful to simply match the first feature of the supine view with that of the prone view and proceed until all features are thus matched. FIG. 8B shows a simple aligning of the two centerlines at their hepatic flexures by shifting, or translating, the supine view until its hepatic flexure is aligned with the hepatic flexure of the prone view. Once this coarse alignment is done, correspondence between features can be performed according to the following "simple" matching algorithm:

(a) For every significant feature $f_n^S$ in the supine view, find the closest, prone-view feature $f_m^P$;
(b) Determine if there is any other significant feature in the supine view that is closer to $f_m^P$ than $f_n^S$; and
(c) If there is no closer significant feature in the supine view, then associate, or match, $f_m^P$ with $f_n^S$; otherwise ignore $f_n^S$.

When determining whether a feature is closer than another feature, it is merely in reference to their location, "i" along the abscissa of FIGS. 8A and 8B. For example, a feature $f_7^P$ 804 corresponds to a voxel $v_c$ in the prone data set. Similarly, features 806 (e.g., $f_7^S$) and 808 (e.g., $f_8^S$) each correspond to different voxels, $v_a$ and $v_b$, in the supine data set. Closeness is simply a measure of whether the index of the voxel (e.g., "a" or "b") is closer to "c".

The results from this coarse alignment and matching can achieve location of significant features within a few centimeters in many pairs of data sets. According to another embodiment of the present disclosure, the aligning and matching algorithm is more complex in order to improve the accuracy of matching significant features along different centerlines, especially as these features get farther and farther from the hepatic flexure.

According to this alternate embodiment, the "simple" feature-matching algorithm is applied incrementally from the hepatic flexure according to the algorithm:

(a) match the locations of the hepatic flexures for each centerline as described above;
(b) while significant features exits in the supine data to the right of the hepatic flexure:
 (b)(1) apply the "simple" matching algorithm to the next supine significant feature. If a match is made, then translate, or shift, the supine-view data so that the matched features $f_n^S$ and $f_m^P$ are aligned. If no match occurs, ignore the feature;
(c) again match the locations of the hepatic flexures for each centerline by translating one of the data sets (e.g., the supine-view data); and
(d) while significant features exist in the supine data to the left of the hepatic flexure:
 (d)(1) apply the "simple" matching algorithm to the next supine significant feature. If a match is made, then translate, or shift, the supine-view data so that the matched features $f_n^S$ and $f_m^P$ are aligned. If no match occurs, ignore the feature.

This is similar to the simple matching algorithm but a key difference is that on each side of the hepatic flexure, the matching features are successively, incrementally aligned. In the earlier embodiment, the location of each feature remained the same in the supine data set once the supine data set was translated to match the hepatic flexures. However, in the incremental matching algorithm, each match of a feature to the right of the hepatic flexure further translates (either right or left) those features to the right of the current matched feature. Also, each match of a feature to the left of the hepatic flexure results in further translation, or shifting, of those features to the left of the current matched feature. As a result, for determining the "closest" feature when performing the matching, the locations of the previously matched features are taken into account.

Figure 10:
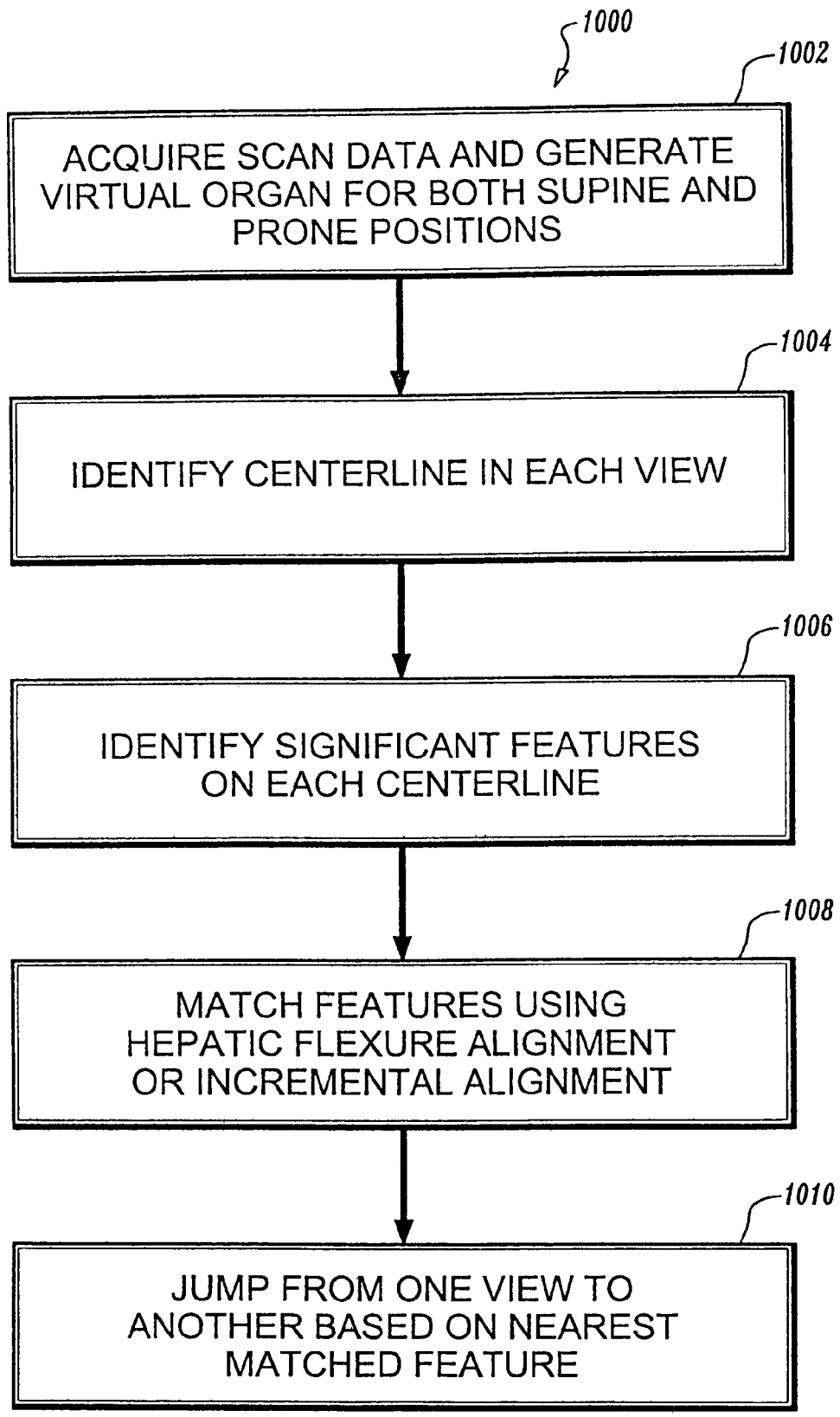
FIG. 10 depicts a flowchart that summarizes a registration method according to an embodiment of the present disclosure.

Turning out of sequence to FIG. 10, a registration method according to an embodiment of the present disclosure is indicated generally by the reference numeral 1000. In step 1002, a patient is scanned in both the prone and supine positions to acquire respective data sets that are used to generate respective three-dimensional representations of an organ, such as a colon. In step 1004, a respective centerline is identified for each virtual organ.

Next, in step 1006, the significant features in each centerline are identified. For example, those features that indicate bends or folds in a colon can be considered as significant features. One method for determining a bend or fold is to measure the change in direction around each voxel; if this measure exceeds a threshold then that voxel is considered to be a significant feature.

Features from one centerline are then matched, in step 1008, to a respective feature in the other centerline. One coarse registration method is to align the respective hepatic flexures and then match features by finding the feature in one data set that is closest to each feature in the other dataset. Another method works outwardly from the hepatic flexure and incrementally shifts one data set's position as a feature in that data set is matched to a feature in the other data set.

In step 1010, an operator can utilize the matched feature information to arrive at the same relative location when jumping from the supine-view virtual organ to the prone-view virtual organ.

Sometimes, the colon segmentation algorithm thus described produces two or more disjoint colon segments. The algorithms described above would thus work only for segments that included the hepatic flexure.

Figure 9:
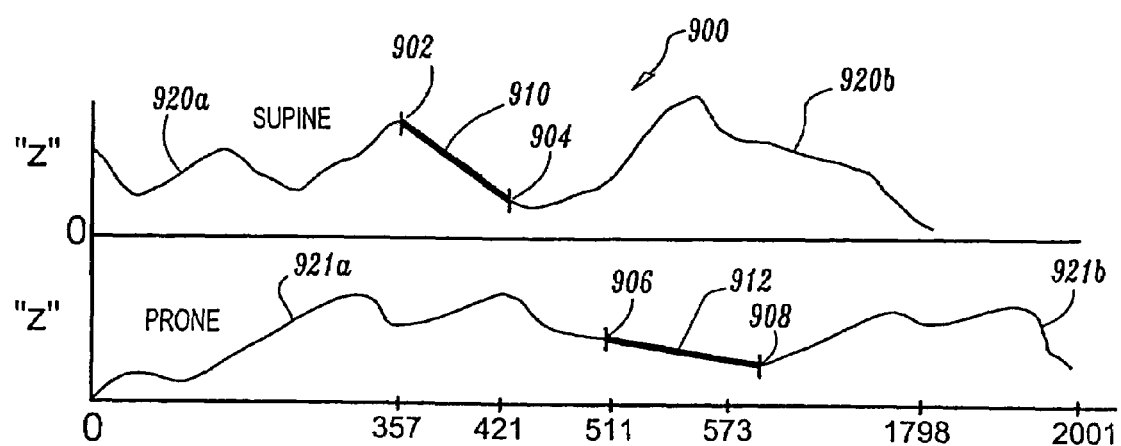
FIG. 9 depicts a supine view (similar to that of FIG. 7A) and a prone view (similar to FIG. 7B) each having two disjoint segments.

Referring now to FIG. 9, a plot of views each having two disjoint segments is indicated generally by the reference numeral 900. The plot 900 depicts a supine view (similar to that of FIG. 7A) and a prone view (similar to that of FIG. 7B), each having two disjoint segments. The supine view has segments 900a and 900b, which have endpoints 902 and 904, respectively. The prone view has segments 901a and 902b with endpoints 906 and 908, respectively. In order to use the above matching algorithms, the two segments of each view are connected by linear interpolation between the two endpoints. For example, in the supine view, a line segment 910 is added to marry the segments 900a and 900b. Similarly, a line segment 912 is added to the prone view. These same principles can easily be applied to more than two disjoint segments. As a result, the hepatic flexures can be aligned and matching commenced. In a preferred embodiment, matching is performed only for the original segments, not the interpolated regions.

An additional embodiment of the disclosure modifies the constant "k" near the endpoint of a colon segment. The features that are matched by the previously described registration algorithms are the peaks in the curve that reflected the change in direction about a point. To calculate this for each point, these algorithms looked ahead and behind a point by "k" voxels, where was such as about 100 voxels, for example. Thus, the change-in-direction data begins and ends 100 voxels from a segment start and end, respectively. Furthermore, there is a 200-voxel gap where disjoint segments meet. In order to make use of more data near segment endpoints and to be able to analyze shorter segments, "k" decreases linearly towards some minimum value as an endpoint is approached. For example, if $k_{max}$=100 and $k_{min}$=10, the matching algorithms can be used to compute change in direction values to within 10 voxels of the endpoints and the gap between disjoint segments is thereby reduced to 20 voxels.

The value "j" described above when determining those features that are significant is used to determine how many voxels ahead of and behind a voxel to look. While j=1 provides the best resolution, it can sometimes result in a cluster of features that actually represent only a single feature. Increasing the value to j=10 still results in a feature at each peak within the change-in-direction curve (e.g., 704a), and false clusters of features can be avoided.

A similar effect can be achieved using a value representing a minimum distance between features ("MDBF"). For example if the MDBF=3, any features without 3 voxels between them are merged into a single cluster.

In some instances, the first feature to the right (or left) of the hepatic flexure may be a relatively large distance away. In these cases, the incremental matching algorithm may not provided the desired accuracy. One alternative for addressing these cases is to provide a graphical interface to an operator that displays the supine and prone plots with features shown. The operator can then select two features (as opposed to the hepatic flexures) to use for seeding the initial coarse alignment. Another alternative is to define the hepatic flexure on each plot as the feature with the highest "z" value, rather than just the voxel with the highest z value.

Once the respective features of each plot are identified and matched, then the goal of switching between the supine and prone views can be achieved. While navigating a virtual organ, such as a colon, based on either a supine or a prone data set according to the system and methods described herein, the operator can click on a position. Using the location and distance of the closest matched feature, the equivalent of the original position in the alternate view is displayed within a virtual organ c.

The foregoing merely illustrates the principles of the disclosure. It will thus be appreciated that those skilled in the art will be able to devise numerous systems, apparatus and methods which, although not explicitly shown or described herein, embody the principles of the disclosure and are thus within the spirit and scope of the disclosure as defined by its Claims.

For example, the methods and systems described herein could be applied to virtually examine an animal, fish or inanimate object. Besides the stated uses in the medical field, applications of the technique could be used to detect the contents of sealed objects that cannot be opened. The technique could also be used inside an architectural structure such as a building or cavern and enable the operator to navigate through the structure.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture.

Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which embodiments of the present disclosure are programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended Claims.

What is claimed is:

1. A method for registering a plurality of three-dimensional volume data sets of at least one object, the method comprising:
   locating a first set of features along an object centerline within a first three-dimensional volume data set;
   locating a second set of features along an object centerline within a second three-dimensional volume data set; and
   matching at least one feature in one of the first or second data sets with a corresponding feature in the other data set,
   wherein the object is an organ within body and the organ is one of a lung or a heart.

2. A method as defined in claim 1 wherein the first and second data sets correspond to a prone view and a supine view, respectively.

3. A method as defined in claim 2, further comprising:
   scanning the at least one object with a scanning device and producing prone-view scan data representative of the object in a prone orientation;
   creating the prone-view three-dimensional volume representation from said prone-view scan data;
   scanning the at least one object with a scanning device and producing supine-view scan data representative of the object in a supine orientation; and
   creating the supine-view three-dimensional volume representation from said supine-view scan data.

4. A method as defined in claim 2 wherein the object is colon and each centerline has a respective hepatic flexure, and matching comprises:
   shifting the prone-view and supine-view centerlines to align the respective hepatic flexures;
   for each particular feature in the second set, locating a closest feature in the first set;
   determining if another feature in the second set is closer to the closest feature than the particular feature; and
   if the other feature is closer, then matching the other feature with the closest feature, and otherwise matching the particular feature with the closest feature.

5. A method as defined in claim 4, further comprising:
   performing a guided navigation of one of the prone or supine view representations along a defined path;
   displaying volume elements in real time at a current location along the defined path, the volume elements responsive to said path and any operator's input during the guided navigation; and
   aligning a location in one view to a location in the other view based on the current location.

6. A method as defined in claim 5 wherein jumping comprises:
   identifying a direction and distance of a closest feature to the current location; and
   locating the target location based upon the feature corresponding to the closest feature.

7. A method as defined in claim 1 wherein matching comprises:
   for each particular feature in the second set, locating a closest feature in the first set;
   determining if another feature in the second set is closer to the closest feature than the particular feature; and
   if the other feature is closer, then ignoring the particular feature and matching the other feature with the closest feature, and otherwise matching the particular feature with the closest feature.

8. A method for performing a three-dimensional internal examination of at least one organ, comprising:
   scanning the organ with a radiological device and producing first and second scan data sets representative of the organ in prone and supine views, respectively;
   creating a prone-view three-dimensional volume representation of the organ comprising volume elements from the prone-view scan data;
   creating a supine-view three-dimensional volume representation of the organ comprising volume elements from the supine-view scan data;
   generating a prone-view organ centerline and a supine-view organ centerline within the respective three-dimensional representations; and
   displaying in real time the volume elements responsive to the respective centerline and any operator's input during a guided navigation along one of the supine-view or prone-view three-dimensional representations,
   wherein the object is an organ within a body and the organ is one of a lung or a heart.

9. A method as defined in claim 8, further comprising:
   identifying a first set of features along the prone-view centerline;
   identifying a second set of features along the supine-view centerline; and
   matching each feature in one of the first or second sets with a corresponding feature in the other set.

10. A method for performing a three-dimensional internal examination of at least one organ, comprising:
    scanning the organ with a radiological device and producing first and second scan data sets representative of the organ in prone and supine views, respectively;
    creating a prone-view three-dimensional volume representation of the organ comprising volume elements from the prone-view scan data;
    creating a supine-view three-dimensional volume representation of the organ comprising volume elements from the supine-view scan data;

generating a prone-view organ centerline and a supine-view organ centerline within the respective three-dimensional representations;

displaying in real time the volume elements responsive to the respective centerline and any operator's input during guided navigation along one of the supine-view or prone-view three-dimensional representations;

identifying a first set of features along the prone-view centerline;

identifying a second set of features along the supine-view centerline;

matching each feature in one of the first or second sets with a corresponding feature in the other set;

determining for each particular voxel along the respective centerline a change-in-direction value; and identifying the particular voxel as a feature for inclusion in the respective set if its change-in-direction value satisfies a particular threshold.

11. A method as defined in claim 10 wherein determining a change-in-direction value comprises:

calculating a first vector from a fist voxel, said first voxel located k units before the particular voxel along the respective centerline wherein k is an integer greater than zero;

calculating a second vector from the particular voxel to a second voxel located k units after the particular voxel on the respective centerline; and calculating a change-in-direction value, $a_1$, for the particular vector by subtracting the first vector from the second vector.

12. A method as defined in claim 11 wherein identifying comprises:

determining if the change-in-direction value, $a_1$, for the particular voxel is greater than or equal to a change-in-direction value, $a_2$, for a third voxel located j units before the particular voxel along the respective centerline wherein j is an integer greater than zero;

determining if the change-in-direction value, $a_1$, for the particular voxel is greater than or equal to a change-in-direction value, $a_3$, for a fourth voxel located j units after the particular voxel along the respective centerline;

determining if a quantity responsive to $a_1$, $a_2$ and $a_3$ exceeds or equals the predetermined threshold; and identifying the particular voxel as a feature within the respective set if all three determinations are satisfied.

13. A method as defined in claim 12 wherein the quantity is $[a_1-0.5(a_2+a_3)]$.

14. A method for performing a three-dimensional internal examination of at least one organ, comprising:

scanning the organ with a radiological device and producing first and second scan data sets representative of the organ in prone and supine view, respectively;

creating a prone-view three-dimensional volume representation of the organ comprising volume elements from the prone-view scan data;

creating a supine-view three-dimensional volume representation of the organ comprising volume elements from the supine-view scan data;

generating a prone-view organ centerline and a supine-view organ centerline within the respective three-dimensional representations;

displaying in real time the volume elements responsive to the respective centerline and any operator's input during guided navigation along one of the supine-view or prone-view three-dimensional representations;

identifying a first set of features along the prone-view centerline;

identifying a second set of features along the supine-view centerline; matching each feature in one of the first or second sets with a corresponding feature in the other set;

wherein the organ is a colon and each centerline has a respective hepatic flexure, and matching comprises:

shifting the prone-view and supine-view centerlines to align the respective hepatic flexures;

for each particular feature in the other set, locating a closest feature in the one set;

determining if another feature in the other set is closer to the closest feature than the particular feature; and if the another feature is closer, then matching the another feature with the closest feature, and otherwise matching the particular feature with the closest feature.

15. A method for performing a three-dimensional internal examination of at least one organ, comprising:

scanning the organ with a radiological device and producing first and second scan data sets representative of the organ in prone and supine views, respectively;

creating a prone-view three-dimensional volume representation of the organ comprising volume elements from the prone-view scan data;

creating a supine-view three-dimensional volume representation of the organ comprising volume elements from the supine-view scan data;

generating a prone-view organ centerline and a supine-view organ centerline within the respective three-dimensional representations;

displaying in real time the volume elements responsive to the respective centerline and any operator's input during guided navigation along one of the supine-view or prone-view three-dimensional representations;

identifying a first set of features along the prone-view centerline;

identifying a second set of features along the supine-view centerline; matching each feature in one of the first or second sets with a corresponding feature in the other set;

wherein the organ is a colon and each centerline has a respective hepatic flexure, and matching comprises:

(a) shifting the prone-view and supine-view centerlines to align the respective hepatic flexures;

(b) repeating the following steps for each feature within the first set located on a first side of the hepatic flexure:

(1) for a current feature in the first set, find a closest feature in the second set wherein the current feature is the feature closest, on the first side, to the hepatic flexure;

(2) determine if another feature in the first set is closer to the closest feature than the current feature;

(3) if another feature is closer, then matching the another feature with the closest feature, and otherwise matching the current feature with the closest feature;

(4) translating a position of the features in the second set to align the matched features;

(5) making the next closest feature on the first side the current feature;

(c) repeating the following steps for each feature within the first set located on a second side of the hepatic flexure:

(1) for a current feature in the first set, find a closest feature in the second set wherein the current feature is the feature closest, on the second side, to the hepatic flexure;

(2) determine if another feature in the first set is closer to the closest feature than the current feature;

(3) if another feature is closer, then matching the another feature with the closest feature, and otherwise matching the current feature with the closest feature;

(4) translating a position of the features in the second set to align the matched features; and (5) making the next closest feature on the second side the current feature.

16. A method for performing a three-dimensional internal examination of at least one organ, comprising:

scanning the organ with a radiological device and producing first and second scan data sets representative of the organ in prone and supine view, respectively;

creating a prone-view three-dimensional volume representation of the organ comprising volume elements from the prone-view scan data;

creating a supine-view three-dimensional volume representation of the organ comprising volume elements from the supine-view scan data;

generating a prone-view organ centerline and a supine-view organ centerline within the respective three-dimensional representations;

displaying in real time the volume elements responsive to the respective centerline and any operator's input during guided navigation along one of the supine-view or prone-view three-dimensional representations;

identifying a first set of features along the prone-view centerline;

identifying a second set of features along the supine-view centerline;

matching each feature in one of the first or second sets with a corresponding feature in the other set;

jumping from a current location in the displayed one three-dimensional representation to a target location in the other three-dimensional representation; and displaying the other three-dimensional representation.

17. A method as defined in claim 16 wherein jumping further comprises:

identifying a current feature in the respective set closest to the current location;

calculating a distance and direction of the current feature with respect to the current location; and calculating the target location based on the distance, the direction and a target feature corresponding to the current feature.

* * * * *